J. P. KIMMEL.
PIPE TESTING PLUG.
APPLICATION FILED NOV. 30, 1914.

1,176,463.

Patented Mar. 21, 1916.

Witnesses
Nelson H. Copp
H. E. Stonebraker

Inventor
Joseph P. Kimmel
By Church & Rich
his Attorneys

UNITED STATES PATENT OFFICE.

JOSEPH P. KIMMEL, OF WARSAW, NEW YORK.

PIPE-TESTING PLUG.

1,176,463.  Specification of Letters Patent.  Patented Mar. 21, 1916.

Application filed November 30, 1914. Serial No. 874,922.

*To all whom it may concern:*

Be it known that I, JOSEPH P. KIMMEL, of Warsaw, in the county of Wyoming and State of New York, have invented certain new and useful Improvements in Pipe-Testing Plugs; and I do hereby declare the following to be a full, clear, and exact description of the same, reference being had to the accompanying drawings, forming a part of the specification, and to the reference-numerals marked thereon.

My invention relates to pipe testing plugs of the class employed for closing the ends of lead pipes or lead bends when applying hydrostatic tests for determining whether a system is tight throughout, and whether the line of pipe is properly joined, and it has for its object to afford a simple construction composed of a minimum number of parts which may be readily applied to the end of a pipe, and is effective in holding the pipe completely sealed.

A further purpose of the invention resides in the provision of means for bracing the exterior of the pipe at the point where the plug is applied so as to prevent the pipe from being expanded by the interior pressure of the plug.

To these and other ends the invention consists in certain improvements and combinations of parts all as will be hereinafter more fully described, the novel features being pointed out in the claims at the end of the specification.

Figure 1:
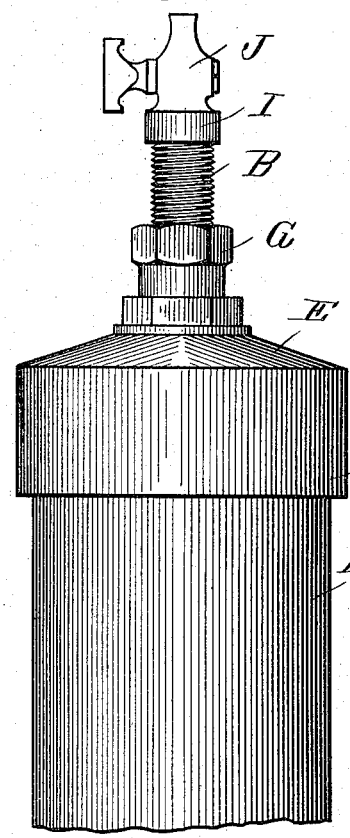
Figure 2:
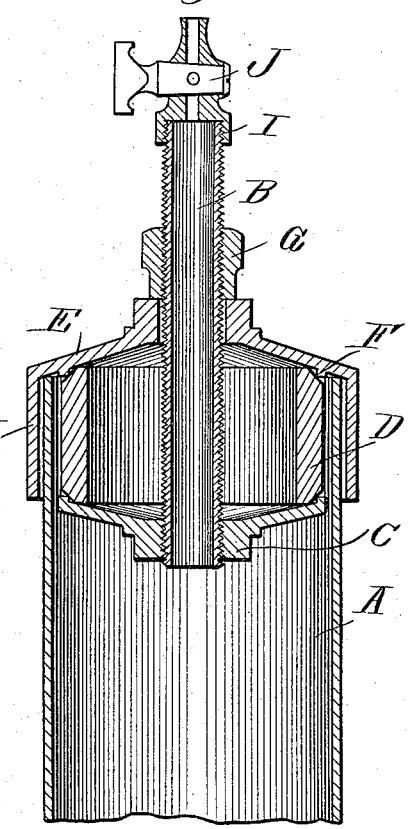
Figure 3:
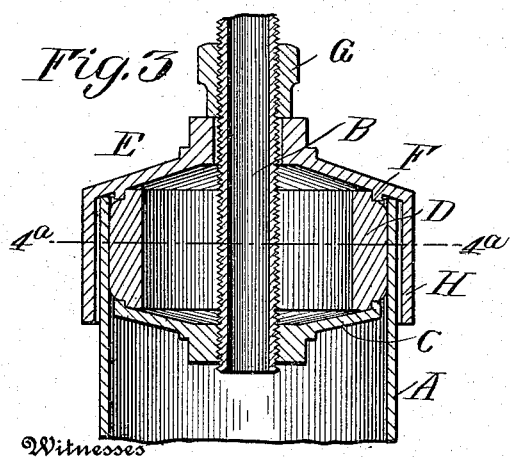
Figure 4:
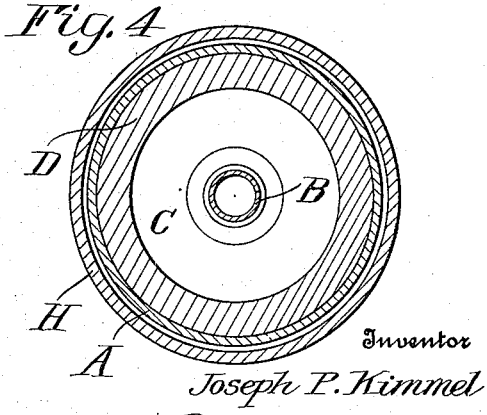

In the drawings: Figure 1 is a side elevation of one embodiment of my invention, showing its application to the end of a pipe; Fig. 2 is a vertical sectional view showing the position of the parts before the expansible member is forced against the interior wall of the pipe; Fig. 3 is a similar view showing the expansible member in engagement with the interior wall, and Fig. 4 is a horizontal sectional view on the line 4ª—4ª of Fig. 3.

Similar reference characters in the several figures indicate the same parts.

In the present embodiment, A designates a pipe to which the device is applied, said pipe constituting a portion of a system or pipe line that is to be tested by the application of liquid pressure interiorly.

B designates a rod or stem that is preferably hollow, and is provided at its lower end with means for supporting an expansible ring. To this end, the rod B may be threaded exteriorly to receive the supporting means, which consists of a plate C. Arranged on plate C is an expansible ring D, which is preferably made of rubber, and may be expanded by pressure, against the interior of the wall of the pipe to seal the latter. In order to effect expansion of the ring D, I provide a follower E which carries a flange F arranged to engage the upper edge of the expansible ring, so that when pressure is applied to the follower, to move it toward the support C, the ring D is forced outwardly to engage the wall of the pipe, as shown in Fig. 3.

G is a nut threaded on the rod B, and which when turned serves to force the follower toward the expansible ring.

When the expansible ring is moved outwardly into engagement with the inner surface of the wall of the pipe, the pipe is likely to be spread or bulged, especially if excessive pressure is applied, unless means are provided to support the portion of the wall against which pressure is applied. This is particularly the case with lead pipes, and to overcome this objection, I mount on the follower E a means for engaging the exterior surface of the pipe at points substantially opposite the expansible ring D. This may be accomplished by a band H that is carried by the follower E and is arranged exteriorly of the ring D in spaced relation thereto. The band H contacts with the outer surface of the wall of the pipe in horizontal planes substantially coincident with the expansible ring D, and forms a rigid brace for the wall of the pipe so as to prevent the latter from being stretched or moved out of its normal relation by the application of excessive pressure. By forming the rod B hollow, the hydrostatic testing pressure may be applied therethrough if desirable, as in some instances. When pressure is applied through the pipe, the hollow rod B is closed by means of the cap I, which is provided with a pet clock J, the latter being normally closed, and opened when it is desired to ascertain the amount of pressure within the pipe.

The construction described affords an extremely simple arrangement, having few parts, and which can be applied quickly, while at the same time providing effective means for sealing a pipe temporarily in such a manner as to prevent any injury to the portion of the pipe to which the plug is applied.

I claim as my invention:

1. A pipe testing plug comprising in combination a rod or stem having supporting means secured to one end thereof, an expansible ring located on the supporting means, a follower disposed loosely on the rod for engagement with said ring, and means formed integral with the follower, adapted to engage the exterior of a pipe to which the device is applied.

2. A pipe testing plug comprising in combination a rod or stem having supporting means secured to one end thereof, an expansible ring located on the supporting means, a follower disposed loosely on the rod for engagement with said ring, and a band formed integral with the follower adapted to engage the exterior of a pipe to which the device is applied at points opposite to and coextensive with the aforementioned expansible ring.

JOSEPH P. KIMMEL.

Witnesses:
J. L. WOODWORTH,
ROSE M. DILLON.

Copies of this patent may be obtained for five cents each, by addressing the "Commissioner of Patents, Washington, D. C."